(12) United States Patent
Chen et al.

(10) Patent No.: US 9,924,796 B2
(45) Date of Patent: Mar. 27, 2018

(54) SLIDE RAIL ASSEMBLY

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 15/390,738

(22) Filed: Dec. 27, 2016

(65) Prior Publication Data

US 2018/0014643 A1 Jan. 18, 2018

(30) Foreign Application Priority Data

Jul. 13, 2016 (TW) .............................. 105122157 A (51) Int. Cl.
| | |
|---|---|
| *A47B 88/00* | (2017.01) |
| *A47B 88/463* | (2017.01) |
| *A47B 88/477* | (2017.01) |
| *A47B 88/49* | (2017.01) |
| *F16C 29/02* | (2006.01) |

(52) U.S. Cl.
CPC .......... *A47B 88/463* (2017.01); *A47B 88/477* (2017.01); *A47B 88/49* (2017.01); *F16C 29/02* (2013.01); *A47B 2210/0056* (2013.01)

(58) Field of Classification Search
CPC ..... A47B 88/463; A47B 88/49; A47B 88/477; A47B 2210/0056; F16C 29/02
See application file for complete search history.

(56) References Cited

U.S. PATENT DOCUMENTS

| | | | |
|---|---|---|---|
| 5,303,995 A | 4/1994 | Kurihara | |
| 7,850,369 B2 * | 12/2010 | Young ................. | A47B 88/493 312/334.11 |
| 8,172,345 B2 | 5/2012 | Liang | |
| 8,801,120 B2 | 8/2014 | Chen | |
| 2002/0057042 A1 * | 5/2002 | Milligan ................ | A47B 88/49 312/334.46 |

(Continued)

FOREIGN PATENT DOCUMENTS

| | | |
|---|---|---|
| DE | 20 2004 019 738 U1 | 3/2005 |
| EP | 3 000 355 A1 | 3/2016 |

(Continued)

*Primary Examiner* — Hanh V Tran
(74) *Attorney, Agent, or Firm* — Winston Hsu (57) ABSTRACT

A slide rail assembly includes a first rail, a second rail and an auxiliary member. The second rail is movable relative to the first rail. The auxiliary member is configured to be operated between a first state and a second state relative to one of the first rail and the second rail. When the auxiliary member is in the first state, the second rail is able to be moved a predetermined distance from a position relative to the first rail along a direction. When the auxiliary member is in the second state, the auxiliary member is configured to prevent the second rail from being moved the predetermined distance from the position relative to the first rail along the direction.

12 Claims, 10 Drawing Sheets

(56) References Cited

U.S. PATENT DOCUMENTS

| | | | |
|---|---|---|---|
| 2004/0080245 A1* | 4/2004 | Lammens | A47B 88/49 312/333 |
| 2009/0206715 A1* | 8/2009 | Scheffknecht | A47B 67/04 312/319.8 |
| 2012/0001441 A1 | 1/2012 | Juan | |
| 2012/0062088 A1* | 3/2012 | Chen | A47B 88/463 312/319.1 |
| 2013/0004101 A1* | 1/2013 | Chen | A47B 88/463 384/10 |
| 2014/0001938 A1 | 1/2014 | Migli | |
| 2014/0327351 A1* | 11/2014 | Chung | A47B 88/0477 312/333 |
| 2014/0363107 A1 | 12/2014 | Egger | |

FOREIGN PATENT DOCUMENTS

| | | |
|---|---|---|
| JP | H01-209596 A | 8/1989 |
| JP | 20132215 A | 1/2013 |

\* cited by examiner

SLIDE RAIL ASSEMBLY

BACKGROUND OF THE INVENTION

1. Field of the Invention

The present invention relates to a slide rail assembly, and more particularly, to a slide rail assembly applicable to a furniture assembly.

2. Description of the Prior Art

In general, a furniture assembly or an equipment usually comprises a fixed member and a movable member movable relative to the fixed member (take a drawer system for example, a drawer is movable relative to a cabinet). Wherein, when an external force is applied or an earthquake occurs to cause vibration, the movable member of the furniture assembly or the equipment may be moved relative to the fixed member accordingly, such that the furniture assembly or the equipment is opened or closed unintentionally. Therefore, for safety consideration, it is important to develop a product capable of preventing the movable member of the furniture assembly or the equipment from being moved relative to the fixed member along a direction.

SUMMARY OF THE INVENTION

The present invention relates to a slide rail assembly comprising an auxiliary member configured to determine whether a rail is able to be moved a predetermined distance relative to another rail along a direction.

According to an embodiment of the present invention, a slide rail assembly comprises a first rail, a second rail, an auxiliary member and a driving device. The first rail comprises an abutting feature. The second rail is movable relative to the first rail. The auxiliary member is operatively connected to the second rail. The driving device comprises an elastic member. Wherein, when the second rail is moved a predetermined distance from a retracted position along a first direction, the elastic member is configured to provide an elastic force to the second rail for driving the second rail to move relative to the first rail along a second direction. Wherein when the second rail is at the retracted position relative to the first rail and the auxiliary member is operated to be in a first state, the second rail is able to be moved the predetermined distance relative to the first rail along the first direction. Wherein when the second rail is in the retracted position relative to the first rail and the auxiliary member is operated to be in a second state, the second rail is prevented from being moved the predetermined distance relative to the first rail along the first direction due to the auxiliary member being blocked by the abutting feature of the first rail.

Preferably, the slide rail assembly further comprises a contacting member attached to the second rail, and the auxiliary member is operatively connected to the contacting member.

Preferably, the driving device further comprises an engaging member configured to hold the elastic member to accumulate the elastic force.

According to another embodiment of the present invention, a slide rail assembly comprises a first rail, a second rail and an auxiliary member. The second rail is movable relative to the first rail. The auxiliary member is configured to be operated between a first state and a second state relative to one of the first rail and the second rail. Wherein, wherein when the auxiliary member is in the first state, the second rail is able to be moved a predetermined distance from a position relative to the first rail along a first direction. Wherein, when the auxiliary member is in the second state, the auxiliary member is configured to prevent the second rail from being moved the predetermined distance from the position relative to the first rail along the first direction.

According to yet another embodiment of the present invention, a slide rail assembly configured to be mounted to a furniture assembly is provided. The furniture assembly comprises a first furniture part and a second furniture part. The slide rail assembly comprises a first rail, a second rail and an auxiliary member. The first rail is configured to be mounted to the first furniture part. The first rail comprises an abutting feature. The second rail is movable relative to the first rail, and configured to carry the second furniture part. The auxiliary member is operatively connected to the second rail. Wherein, when the auxiliary member is in a first state, the second rail is able to move a predetermined distance from a retracted position relative to the first rail along a first direction. Wherein, when the auxiliary member is switched to a second state from the first state, the auxiliary member is blocked by the abutting feature of the first rail, so as to prevent the second rail from being moved the predetermined distance from the retracted position relative to the first rail along the first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
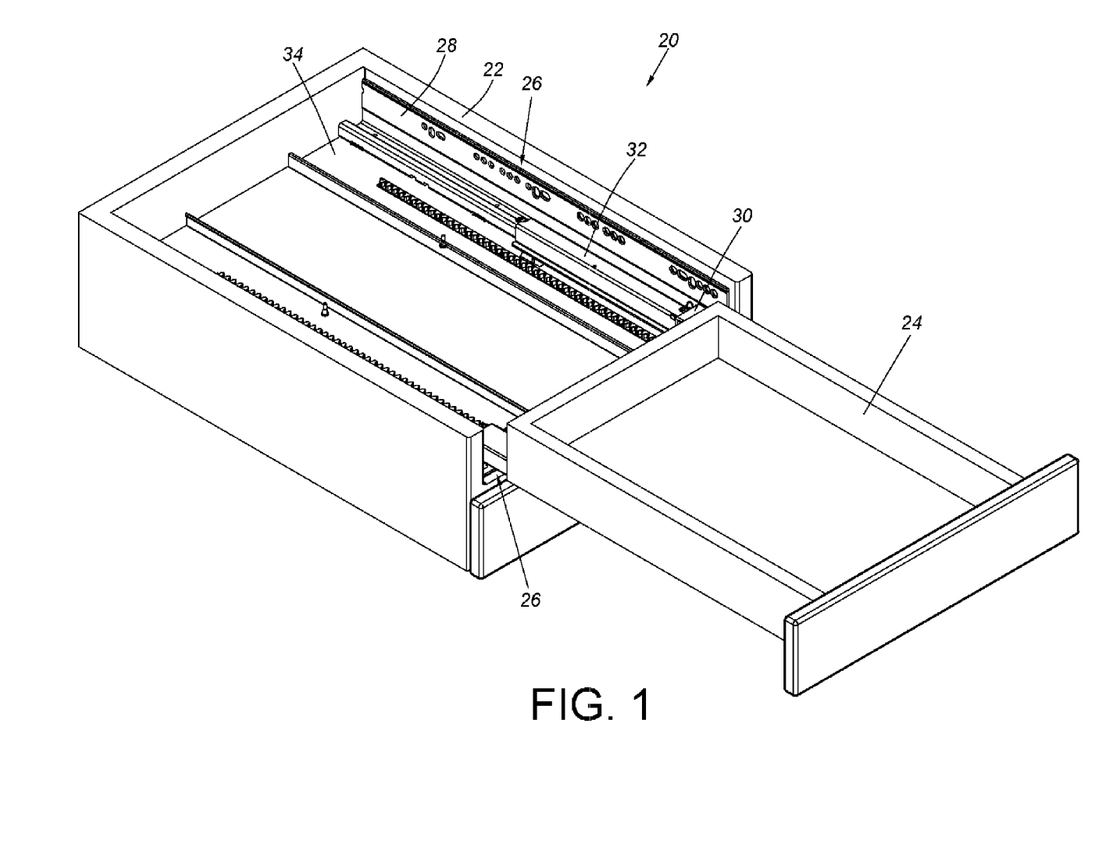
FIG. 1 is a diagram showing a slide rail assembly applied to a first furniture part and a second furniture part according to an embodiment of the present invention.
Figure 2:
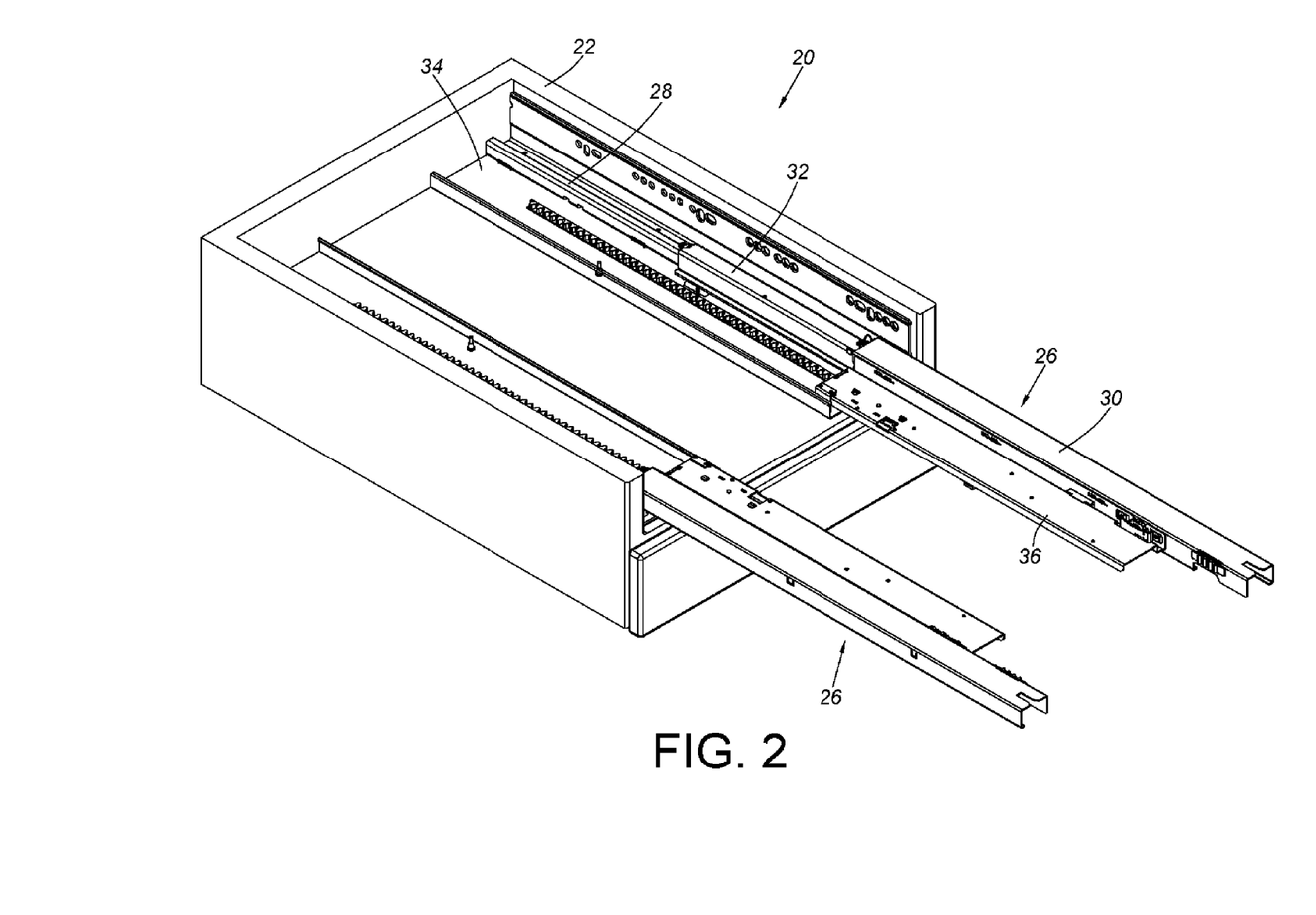
FIG. 2 is a diagram showing the slide rail assembly of FIG. 1 without the second furniture part.

FIG. 1 and FIG. 2 show a furniture assembly 20 comprising a first furniture part 22 and a second furniture part 24 according to an embodiment of the present invention. In the present embodiment, the first furniture part 22 is a cabinet, and the second furniture part 24 is a drawer, but the present invention is not limited thereto. Preferably, with assistance of a slide rail assembly 26, the second furniture part 24 is movable relative to the first furniture part 22.

Specifically, each of the slide rail assemblies 26 comprises a first rail 28 and a second rail 30 movable relative to the first rail 28. Preferably, the slide rail assembly 26 further comprises a third rail 32 configured to extend a traveling distance of the second rail 30 relative to the first rail 28. Wherein, the first rail 28 is mounted to the first furniture part 22, such that the first rail 28 can be seen as a portion of the first furniture part 22. On the other hand, the second rail 30 is mounted to the second furniture part 24 for carrying the second furniture part 24, such that the second rail 30 can be seen as a portion of the second furniture part 24. Preferably, the first rail 28 comprises an extension part 34, and the second rail 30 comprises a carrying part 36.

Figure 3:
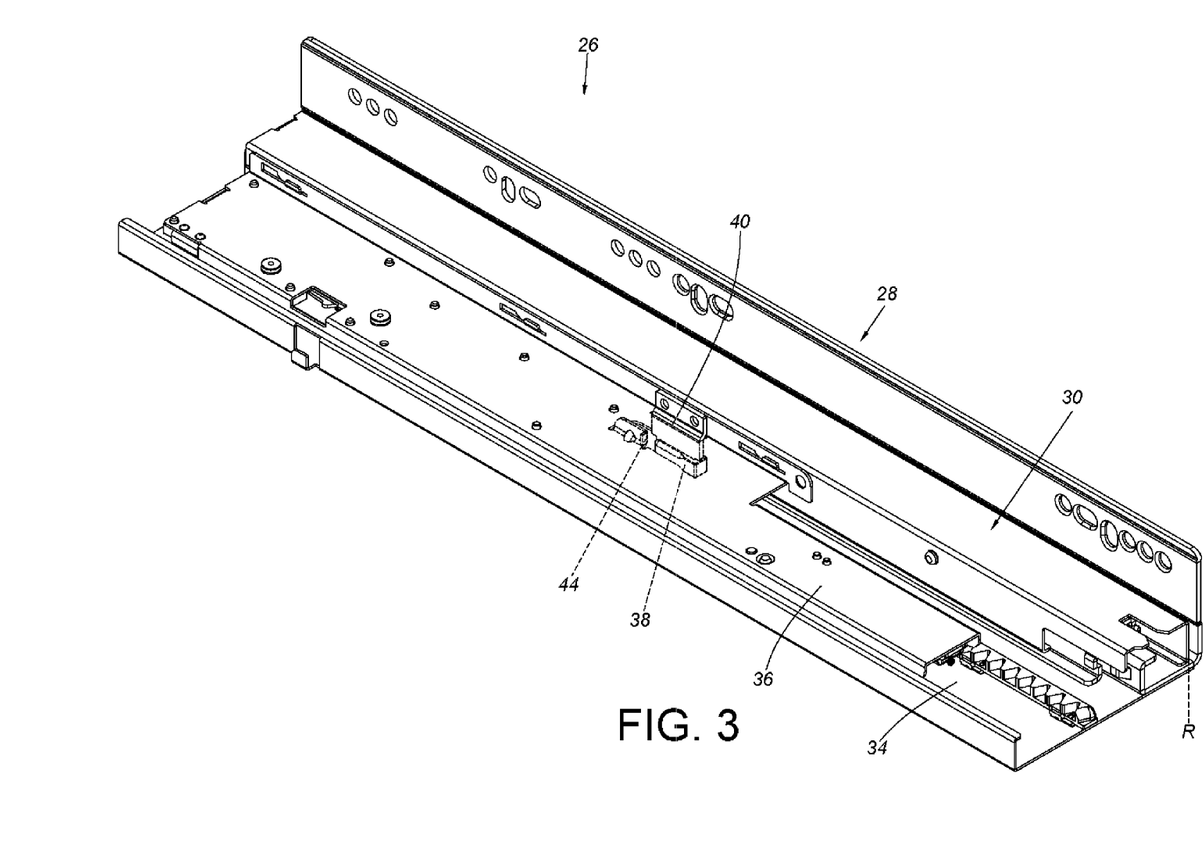
FIG. 3 is a diagram showing the slide rail assembly according to an embodiment of the present invention.

As shown in FIG. 3, the second rail 30 is located at a retracted position R relative to the first rail 28. When the second rail 30 is at the retracted position R, the position of the carrying part 36 of the second rail 30 corresponds to the extension part 34 of the first rail 28.

Figure 4:
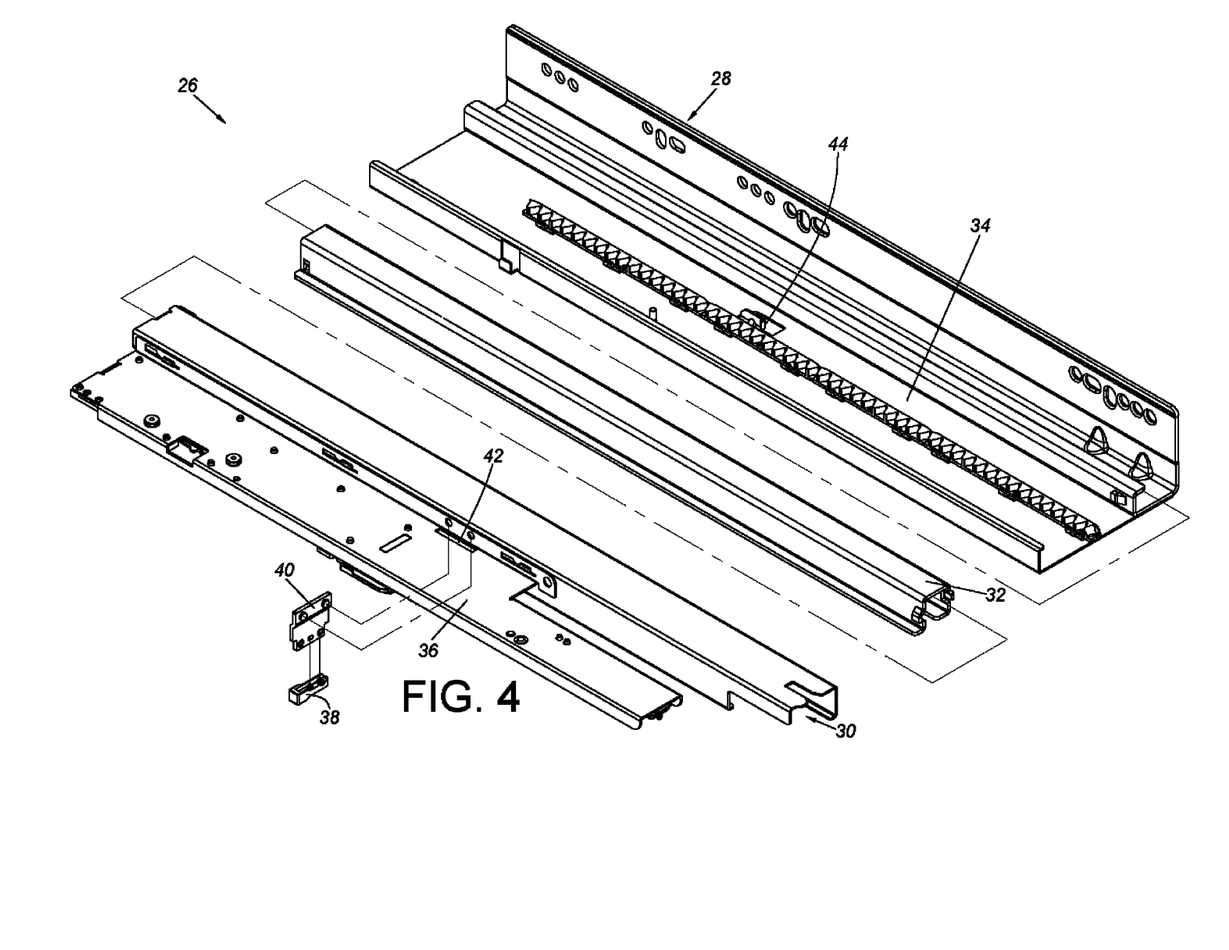
FIG. 4 is an exploded view of the slide rail assembly according to an embodiment of the present invention.

As shown in FIG. 4, the slide rail assembly 26 further comprises an auxiliary member 38. The auxiliary member 38 is operatively connected to one of the first rail 28 and the second rail 30. In the present embodiment, the auxiliary member 38 is operatively connected to the second rail 30. Preferably, the slide rail assembly 26 further comprises a contacting member 40 attached to the second rail 30. The carrying part 36 of the second rail 30 is formed with an opening 42 for allowing the contacting member 40 to penetrate through. Wherein, the contacting member 40 can be fixed to the second rail 30 by riveting, screwing, engaging or welding. As such, the contacting member 40 can be seen as a portion of the second rail 30. Or, the contacting member 40 can be directly and integrally formed on the second rail 30, but the present invention is not limited thereto.

The auxiliary member 38 can be pivoted to the contacting member 40 of the second rail 30, or the auxiliary member 38 can be detachably mounted to the contacting member 40 of the second rail 30, but the present invention is not limited thereto. On the other hand, the first rail 28 comprises an abutting feature 44. The abutting feature 44 can be an element attached to the first rail 28, or the abutting feature 44 can be directly formed on the first rail 28. In the present embodiment, the abutting feature 44 is formed as a wall structure located on the extension part 34.

Figure 5:
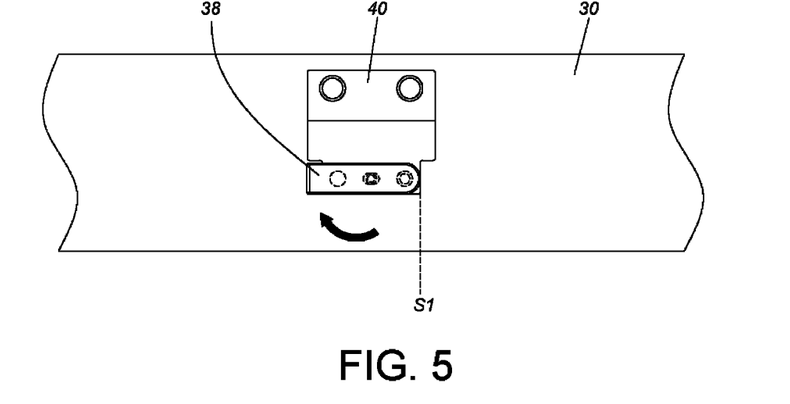
FIG. 5 is a diagram showing an auxiliary member of the slide rail assembly in a first state relative to a rail according to an embodiment of the present invention.
Figure 6:
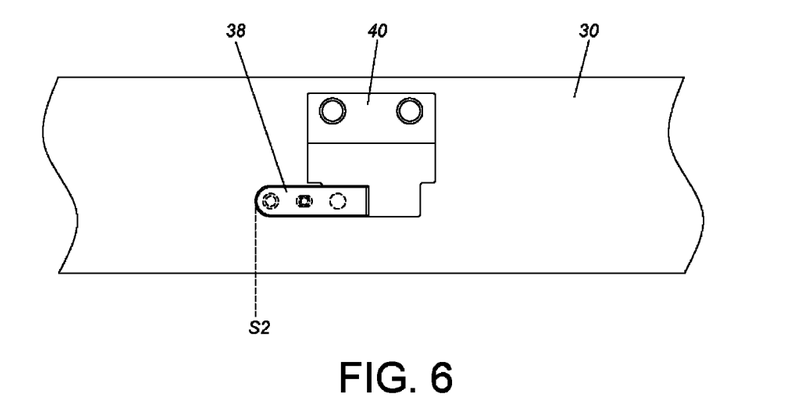
FIG. 6 is a diagram showing the auxiliary member of the slide rail assembly in a second state relative to the rail according to an embodiment of the present invention.

As shown in FIG. 5 and FIG. 6, the auxiliary member 38 is configured to be operated between a first state S1 and a second state S2 relative to the second rail 30. In the present embodiment, the auxiliary member 38 is turned 180 degrees (as indicated by the curved arrow) from the first state S1 to the second state S2 relative to the contacting member 40.

Figure 7:
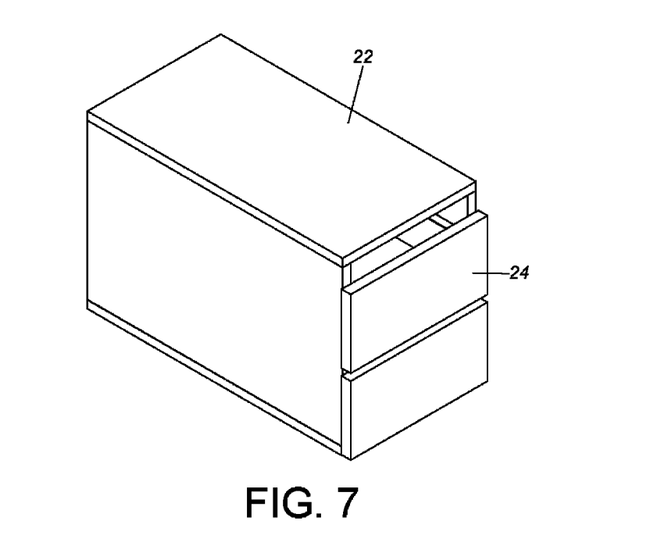
FIG. 7 is a diagram showing a furniture assembly comprising the first furniture part and the second furniture part according to an embodiment of the present invention.
Figure 8:
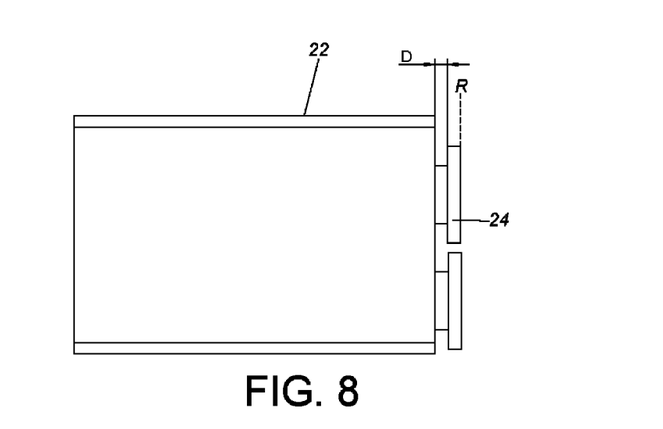
FIG. 8 is a side view of the furniture assembly of FIG. 7.

As shown in FIG. 7 and FIG. 8, when the second furniture part 24 (or the second rail 30) is arranged in a push-open mode relative to the first furniture part 22 (or the first rail 28), and is located at the retracted position R, a predetermined distance D is defined between the second furniture part 24 and the first furniture part 22 in order to allow a user to push the second furniture part 24 to open the second furniture part 24 relative to the first furniture part 22.

Figure 9:
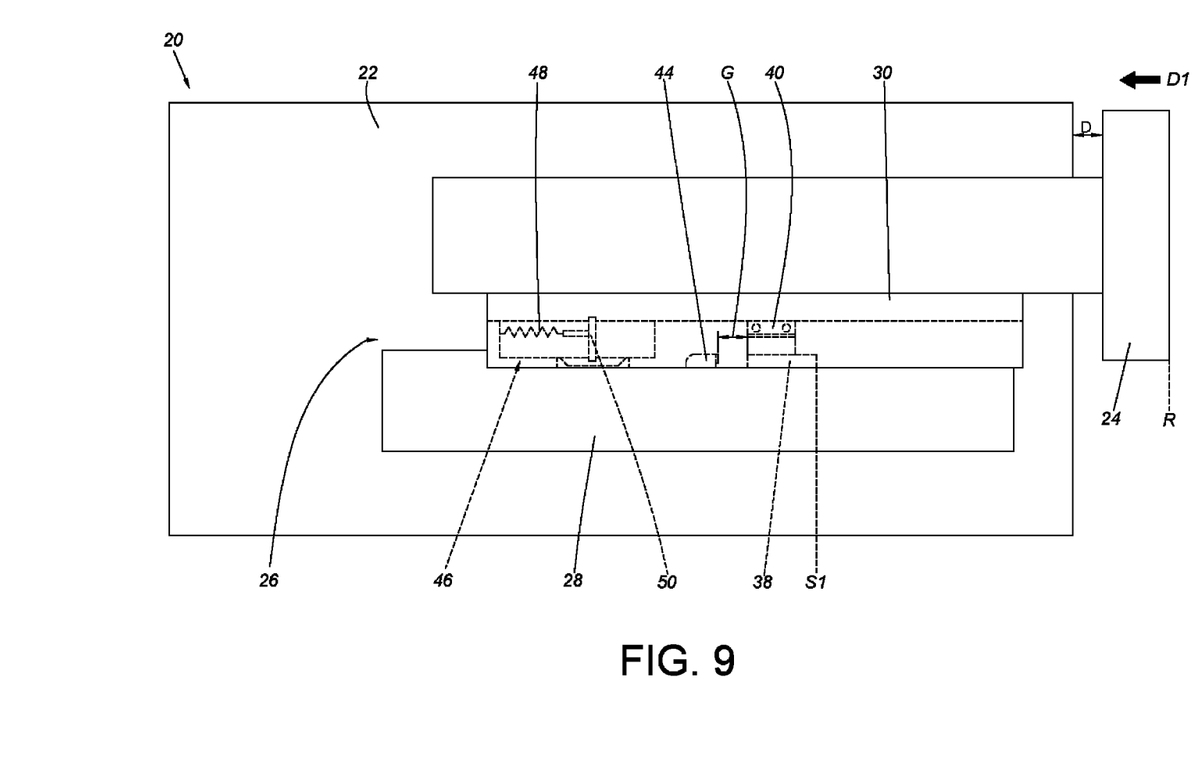
FIG. 9 is a diagram showing the second furniture part of the furniture assembly located at a position relative to the first furniture part according to an embodiment of the present invention, wherein the auxiliary member is in the first state.

As shown in FIG. 9, the furniture assembly 20 (or the slide rail assembly 26) further comprises a driving device 46. The driving device 46 comprises at least one elastic member. In the present embodiment, the driving device 46 comprises only one elastic member 48. The elastic member 48 is configured to release an elastic force to the second furniture part 24 (or the second rail 30). Preferably, the driving device 46 further comprises an engaging member 50. In the present embodiment, the engaging member 50 can be directly or indirectly arranged on the second rail 30. Wherein, the elastic member 48 can be held at a predetermined position by the engaging member 50 for accumulating the elastic force.

The arrangement of the driving device 46 comprising at least one elastic member 48 configured to be held by the engaging member 50 for accumulating the elastic force is obvious to those skilled in the art. For simplification, no further illustration is provided. U.S. Pat. No. 8,172,345 B2 is provided for reference.

Moreover, when the second furniture part 24 (or the second rail 30) is located at a position (such as the retracted position R) relative to the first furniture part 22 (or the first rail 28), and the auxiliary member 38 is in the first state S1, a predetermined gap G is defined between the contacting member 40 of the second rail 30 (or the auxiliary member 38) and the abutting feature 44 of the first rail 28. Preferably, the predetermined gap G is substantially equal to the predetermined distance D.

Figure 10:
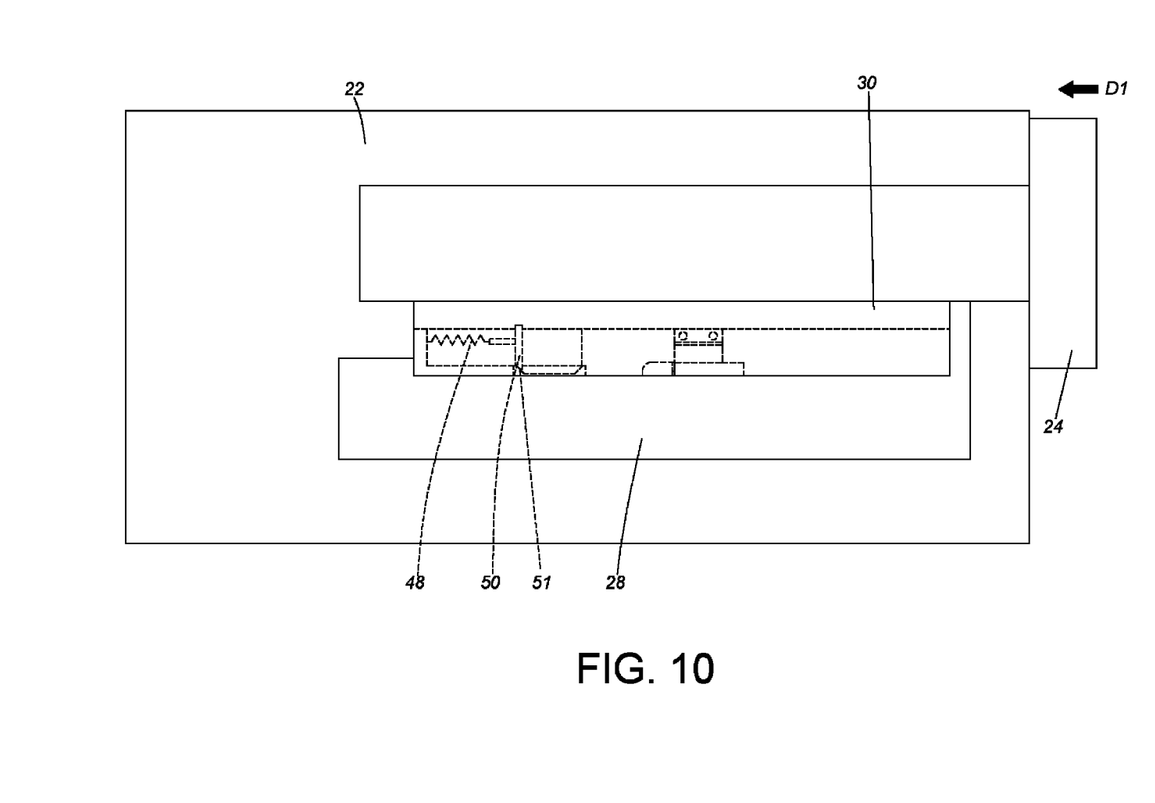
FIG. 10 is a diagram showing the second furniture part of FIG. 9 being moved relative to the first furniture part along a first direction.

As shown in FIG. 9 and FIG. 10, with the predetermined distance G, when the user applies a force to the second furniture part 24 (or the second rail 30) along a first direction D1, the second furniture part 24 (or the second rail 30) is moved the predetermined distance D from the retracted position R relative to the first furniture part 22 (or the first rail 28) along the first direction D1.

Figure 11:
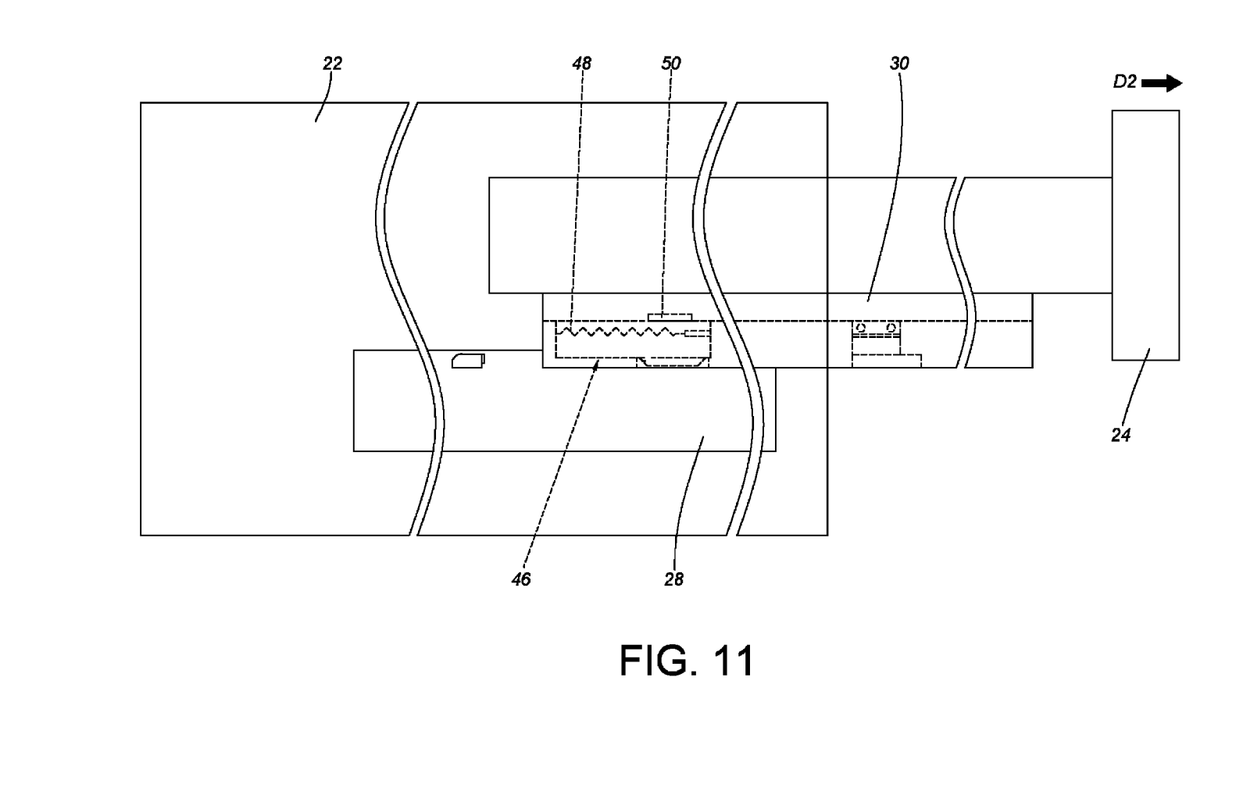
FIG. 11 is a diagram showing the second furniture part of FIG. 10 being moved relative to the first furniture part along a second direction in response to an elastic force of an elastic member of a driving device.

As shown in FIG. 10 and FIG. 11, after the second furniture part 24 (or the second rail 30) is moved the predetermined distance D relative to the first furniture part 22 (or the first rail 28), the engaging member 50 can be moved away from the predetermined position. For example, the engaging member 50 can be guided or driven by an object 51 of the driving device 46 to move away from the predetermined position. In other words, the elastic member 48 is able to release the elastic force.

When the elastic member 48 releases the elastic force, the second rail 30 can be moved relative to the first rail 28 along a second direction D2 in response to the elastic force of the elastic member 48. That is to say, with assistance of the driving device 46, the second rail 30 can be opened automatically relative to the first rail 28 from the retracted position R along the second direction D2.

In other words, when the second rail 30 is moved the predetermined distance D from the retracted position R relative to the first rail 28 along the first direction D1, the elastic member 48 can provide the elastic force to the second rail 30, such that the second rail 30 can be moved relative to the first rail 28 along the second direction D2 in response to the elastic force.

Figure 12:
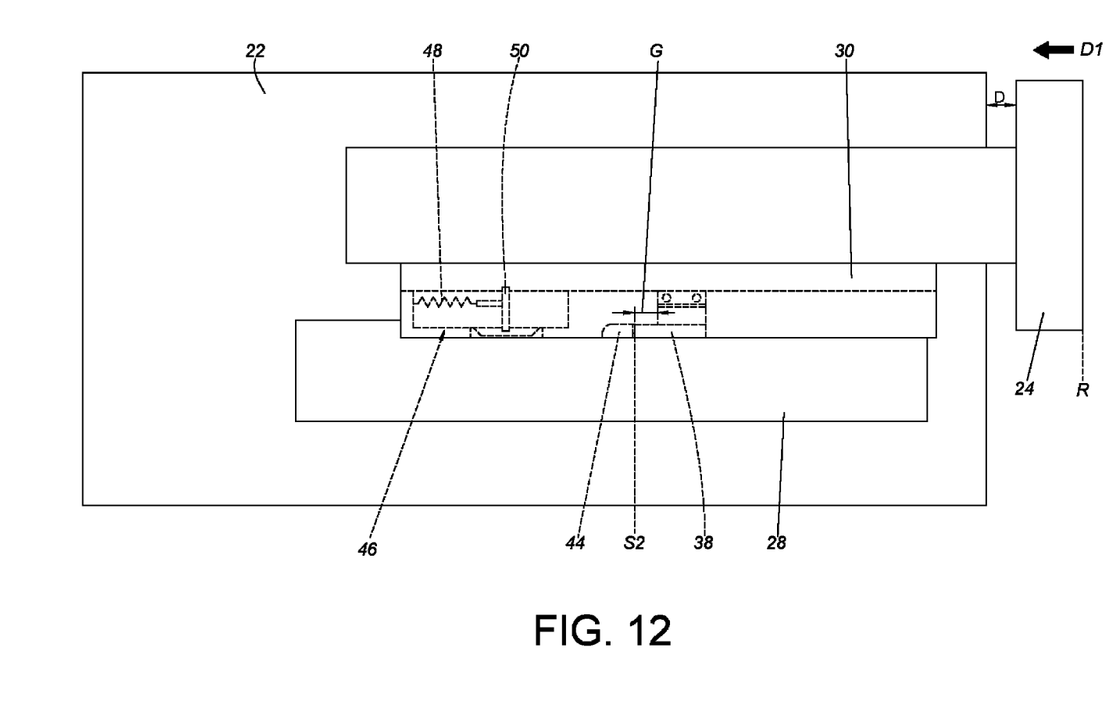
FIG. 12 is a diagram showing the second furniture part of the furniture assembly located at the position relative to the first furniture part according to an embodiment of the present invention, wherein the auxiliary member is in the second state.

As shown in FIG. 12, when the second furniture part 24 (or the second rail 30) is located at the retracted position R relative to the first furniture part 22 (or the first rail 28), and the auxiliary member 38 is in the second state S2, the auxiliary member 38 is blocked by the abutting feature 44 of the first rail 28, such that the second rail 30 is not able to be moved the predetermined distance D relative to the first rail 28 along the first direction D1. In other words, when the auxiliary member 38 is in the second state S2, the auxiliary member 38 is configured to prevent the second rail 30 from being moved the predetermined distance D from the retracted position R relative to the first rail 28 along the first direction D1.

Specifically, even the user applies a force to the second furniture part 24 (or the second rail 30) along the first direction D1, the auxiliary member 38 in the second state S2 is blocked by the abutting feature 44 of the first rail 28, such that the predetermined gap G no longer exists or is very small, such that the second furniture part 24 does not have enough space for push-open operation. Therefore, the second furniture part 24 (or the second rail 30) is not able to be moved the predetermined distance D from the retracted position R relative to the first furniture part 22 (or the first rail 28) along the first direction D1, such that the engaging member 50 stays at the predetermined position in order to hold the elastic member 48 of the driving device 46 to accumulate the elastic force without releasing the elastic force to the second furniture part 24 (or the second rail 30). That is to say, the second furniture part 24 (or the second rail 30) cannot be automatically opened relative to the first furniture part 22 (or the first rail 28) from the retracted position R along the second direction D2 (opposite to the first direction D1).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail comprising an abutting feature;
a second rail movable relative to the first rail;
an auxiliary member operatively connected to the second rail; and
a driving device comprising an elastic member, wherein when the second rail is moved a predetermined distance from a retracted position along a first direction, the elastic member is configured to provide an elastic force to the second rail for driving the second rail to move relative to the first rail along a second direction;
wherein when the second rail is at the retracted position relative to the first rail and the auxiliary member is operated to be in a first state, the second rail is able to be moved the predetermined distance relative to the first rail along the first direction;
wherein when the second rail is in the retracted position relative to the first rail and the auxiliary member is operated to be in a second state, the second rail is prevented from being moved the predetermined distance relative to the first rail along the first direction due to the auxiliary member being blocked by the abutting feature of the first rail.

2. The slide rail assembly of claim 1, further comprising a contacting member attached to the second rail, wherein the auxiliary member is operatively connected to the contacting member.

3. The slide rail assembly of claim 1, wherein the driving device further comprises an engaging member configured to hold the elastic member to accumulate the elastic force.

4. A slide rail assembly, comprising:
a first rail;
a second rail movable relative to the first rail; and
an auxiliary member configured to be operated between a first state and a second state relative to one of the first rail and the second rail;
wherein when the auxiliary member is in the first state, the second rail is able to be moved a predetermined distance from a position relative to the first rail along a first direction;
wherein when the auxiliary member is in the second state, the auxiliary member is configured to prevent the second rail from being moved the predetermined distance from the position relative to the first rail along the first direction.

5. The slide rail assembly of claim 4, wherein the first rail comprises a abutting feature, the auxiliary member is operatively connected to the second rail, the position is a retracted position, when the auxiliary member is in the second state, the auxiliary member is configured to be blocked by the abutting feature of the first rail, so as to prevent the second rail from being moved the predetermined distance from the retracted position relative to the first rail along the first direction.

6. The slide rail assembly of claim 5, further comprising a contacting member attached to the second rail, wherein the auxiliary member is operatively connected to the contacting member.

7. The slide rail assembly of claim 5, further comprising a driving device, the driving device comprising an elastic member, wherein when the auxiliary member is in the first state and the second rail is moved the predetermined distance from the retracted position relative to the first rail along the first direction, the elastic member is configured to release an elastic force to move the second rail relative to the first rail along a second direction.

8. The slide rail assembly of claim 7, wherein the driving device further comprises an engaging member configured to hold the elastic member to accumulate the elastic force.

9. A slide rail assembly configured to be mounted to a furniture assembly, the furniture assembly comprising a first furniture part and a second furniture part, the slide rail assembly comprising:
a first rail configured to be mounted to the first furniture part, the first rail comprising an abutting feature;
a second rail movable relative to the first rail, and configured to carry the second furniture part; and
an auxiliary member operatively connected to the second rail;
wherein when the auxiliary member is in a first state, the second rail is able to move a predetermined distance from a retracted position relative to the first rail along a first direction;
wherein when the auxiliary member is switched to a second state from the first state, the auxiliary member is blocked by the abutting feature of the first rail, so as to prevent the second rail from being moved the predetermined distance from the retracted position relative to the first rail along the first direction.

10. The slide rail assembly of claim 9, further comprising a contacting member attached to the second rail, wherein the auxiliary member is operatively connected to the contacting member.

11. The slide rail assembly of claim 9, further comprising a driving device, the driving device comprising an elastic member, wherein when the auxiliary member is in the first state and the second rail is moved the predetermined distance from the retracted position relative to the first rail along the first direction, the elastic member is configured to release an elastic force to move the second rail relative to the first rail along a second direction.

12. The slide rail assembly of claim 11, wherein the driving device further comprises an engaging member configured to hold the elastic member to accumulate the elastic force.

* * * * *